United States Patent [19]

Berney

[11] Patent Number: 5,659,301

[45] Date of Patent: Aug. 19, 1997

[54] TRANSMISSION SYSTEM

[75] Inventor: Jean-Claude Berney, Les Charbonnières, Switzerland

[73] Assignee: Gay Freres Vente et Exportation S.A., Geneva, Switzerland

[21] Appl. No.: 324,590

[22] Filed: Oct. 18, 1994

[30] Foreign Application Priority Data

Oct. 22, 1993 [CH] Switzerland ............... 03 180/93

[51] Int. Cl.$^6$ ................................................. G08C 19/00
[52] U.S. Cl. ........................... 340/870.3; 340/870.19; 340/825.54
[58] Field of Search ................... 340/870.01, 870.02, 340/870.18, 870.19, 870.25, 870.3, 870.31, 870.32, 870.4, 825.14, 825.54, 825.15; 455/41; 178/2 R, 18, 19, 20

[56] References Cited

U.S. PATENT DOCUMENTS

| 4,663,499 | 5/1987 | Duval | 178/2 R |
|---|---|---|---|
| 4,941,201 | 7/1990 | Davis | 340/870.31 |
| 5,345,231 | 9/1994 | Koo et al. | 340/870.31 |

FOREIGN PATENT DOCUMENTS 0 134 174  3/1985  European Pat. Off. .

Primary Examiner—Jeffery Hofsass
Assistant Examiner—Andrew Hill
Attorney, Agent, or Firm—Walter C. Farley

[57] ABSTRACT

In a method for bidirectional serial data transmission between an integrated memory circuit and a reading/writing circuit which are separated from each other, an integrated memory circuit having two electrical contact points and a reading/writing circuit with a connecting element having two contacts are provided. Data transmission is enabled by connecting the two-contact connecting element to the two electrical contact points of the integrated memory circuit. Data are transmitted from the reading/writing circuit to the integrated memory circuit by superimposing voltage pulses on the voltage supplied to the integrated memory circuit. Data are transmitted from the integrated memory circuit to the reading/writing circuit by modulating supply current consumed by the integrated memory circuit. The integrated memory circuit is driven with an internal clock output and signals corresponding with data to be transmitted to the reading/writing circuit. The generation of cycles of voltage pulses is synchronized in the reading/writing circuit with received cycles of supply current modulations to thereby synchronize the transmission of data between the reading/writing circuit and the integrated memory circuit.

9 Claims, 4 Drawing Sheets 5,659,301

1

TRANSMISSION SYSTEM

FIELD OF THE INVENTION

The present invention relates to a method and a system for serial data transmission between an integrated memory circuit and an external power supply.

BACKGROUND OF THE INVENTION

At present there are integrated ROM, EPROM or EEPROM circuits, which can be read or read and written by a power supply using a suitable external reading/writing device. In such cases information is transmitted in serial form by superimposing signals on the supply voltage. Transmission to the inside of the integrated circuit takes place by amplitude modulated voltage signals superimposed on the supply voltage, said signals being generated by the reading/writing device, whereas transmission to the outside of the integrated circuit takes place by current signals generated by the integrated circuit and superimposed on the base current consumed by it.

This procedure is simple, but can be relatively unreliable due to poor contacts and interference of all types which can deform the signals and falsify their interpretation.

SUMMARY OF THE INVENTION

An object of the present invention is to provide a method and a system for the transmission and control of data on the supply voltage having a very great operational reliability and security.

According to the invention, this object is achieved in that the serial data transmission between an integrated memory circuit and an external power supply supplying a supply current to the integrated circuit takes place in the following way. In order to form an output signal of the integrated circuit, the supply current is modulated as a function of the data generated by the integrated memory circuit. For forming an input signal for the integrated circuit, signals generated as a function of the data to be transmitted to the integrated memory circuit are superimposed on the supply voltage. Moreover, the input signal and the output signal are synchronized. More specifically, the current signals supplied by the integrated circuit are width-modulated fixed frequency signals, a reading/writing device being arranged so as to generate voltage signals synchronous with said current signals generated by the integrated circuit, the phase between said current signals and said voltage signals being representative of the logic states of the informations to be transmitted to the integrated circuit.

This method and system make it possible to limit the number of integrated circuit connections, which is particularly useful in certain applications where miniaturization is important, such as e.g. in quartz watches.

BRIEF DESCRIPTION OF THE DRAWINGS

The invention is described in greater detail hereinafter with reference to the attached drawings, wherein.

2

Figure 5:
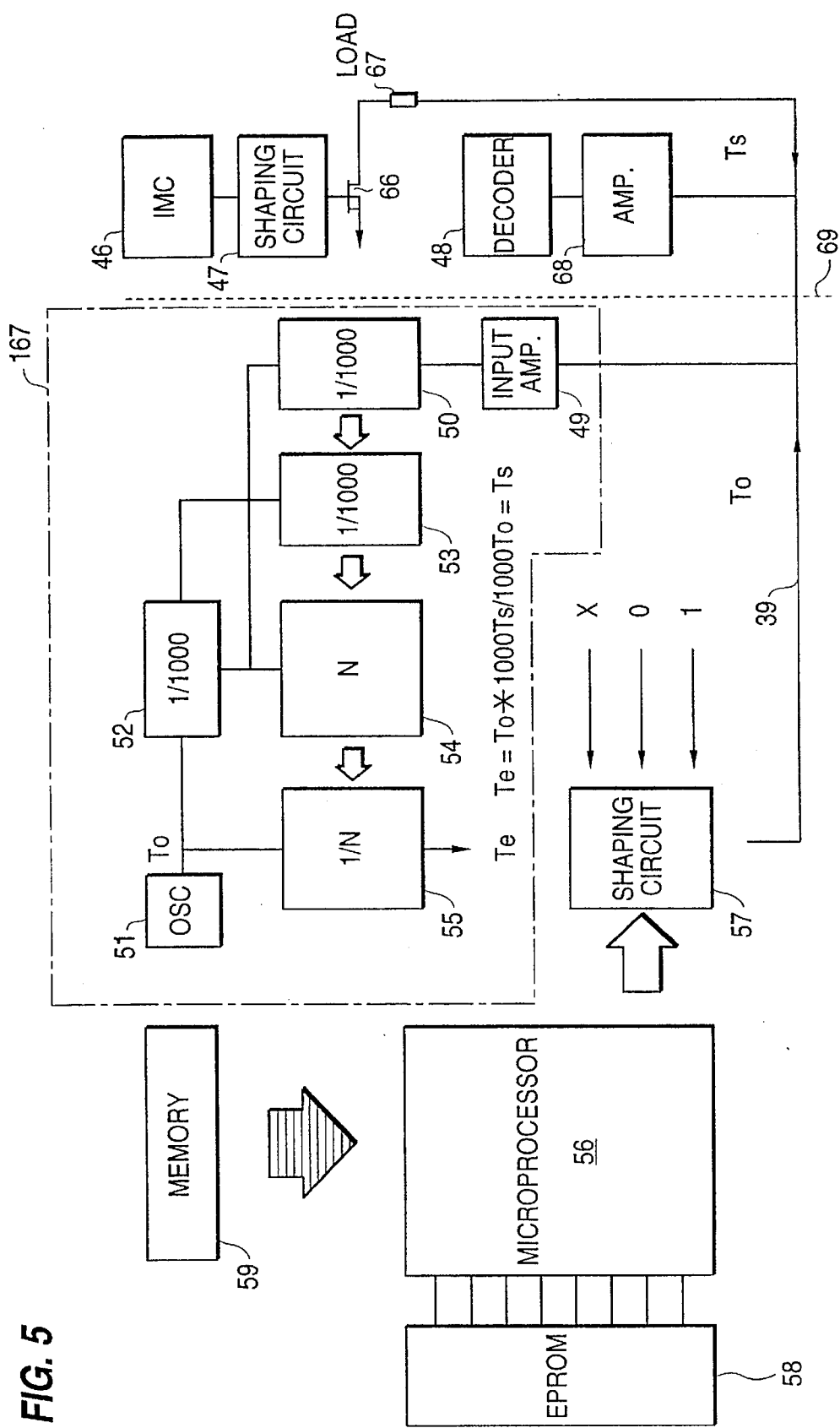

FIG. 5 is a schematic circuit diagram of a synchronizing device between the input and output signals.

Figure 6:
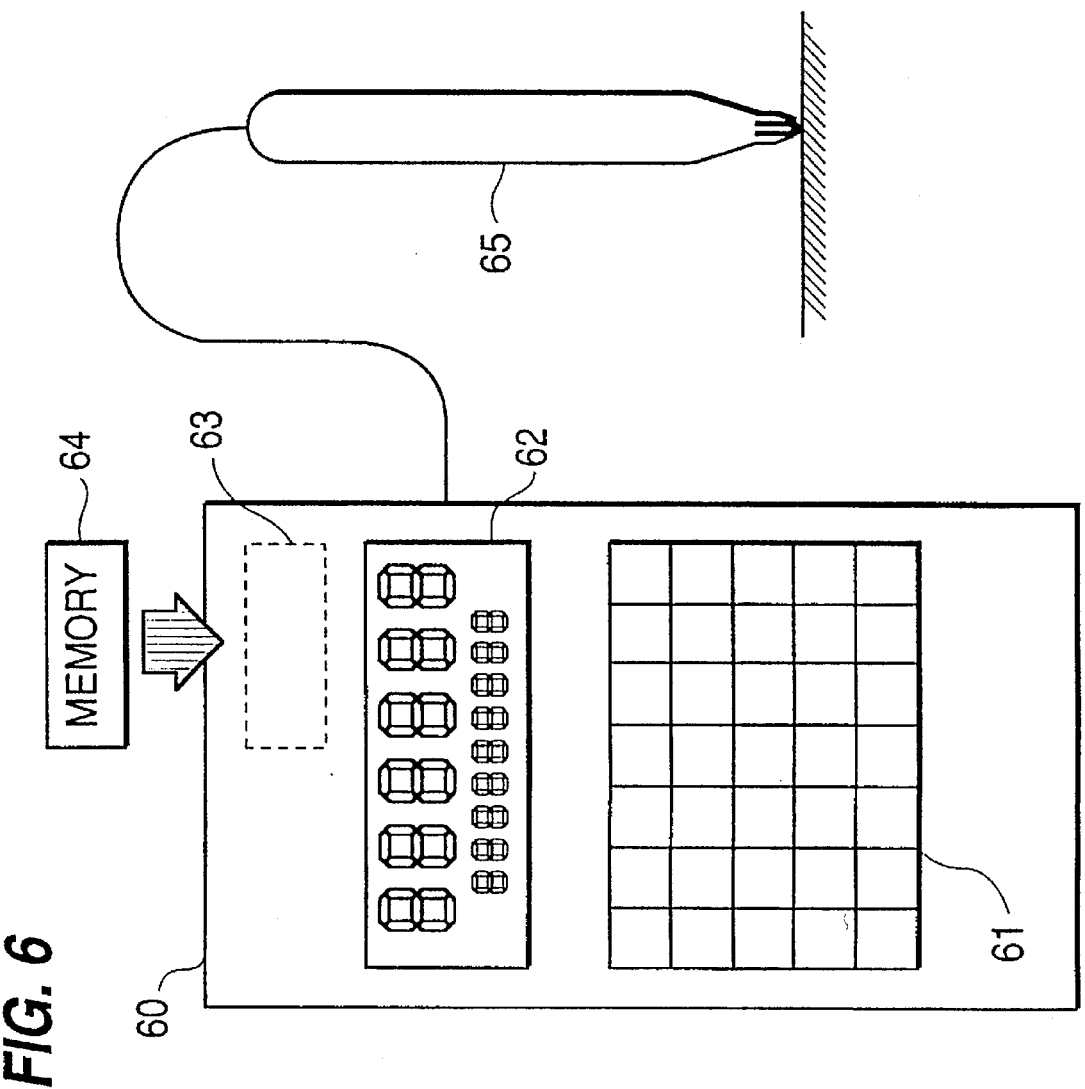

FIG. 6 is a schematic view of a complete system with its reading/writing device.

Figure 7:
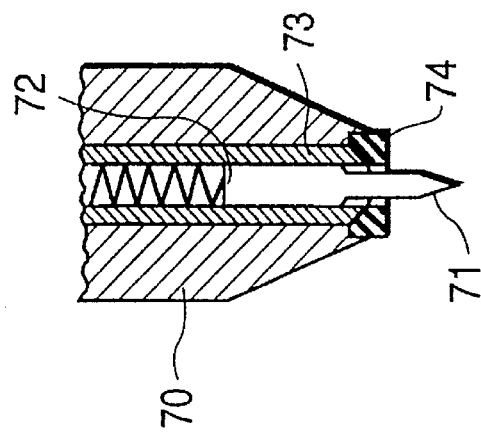

FIG. 7 is an enlarged partial sectional view of a connecting system with contact.

DESCRIPTION OF THE PREFERRED EMBODIMENTS

Figure 1:
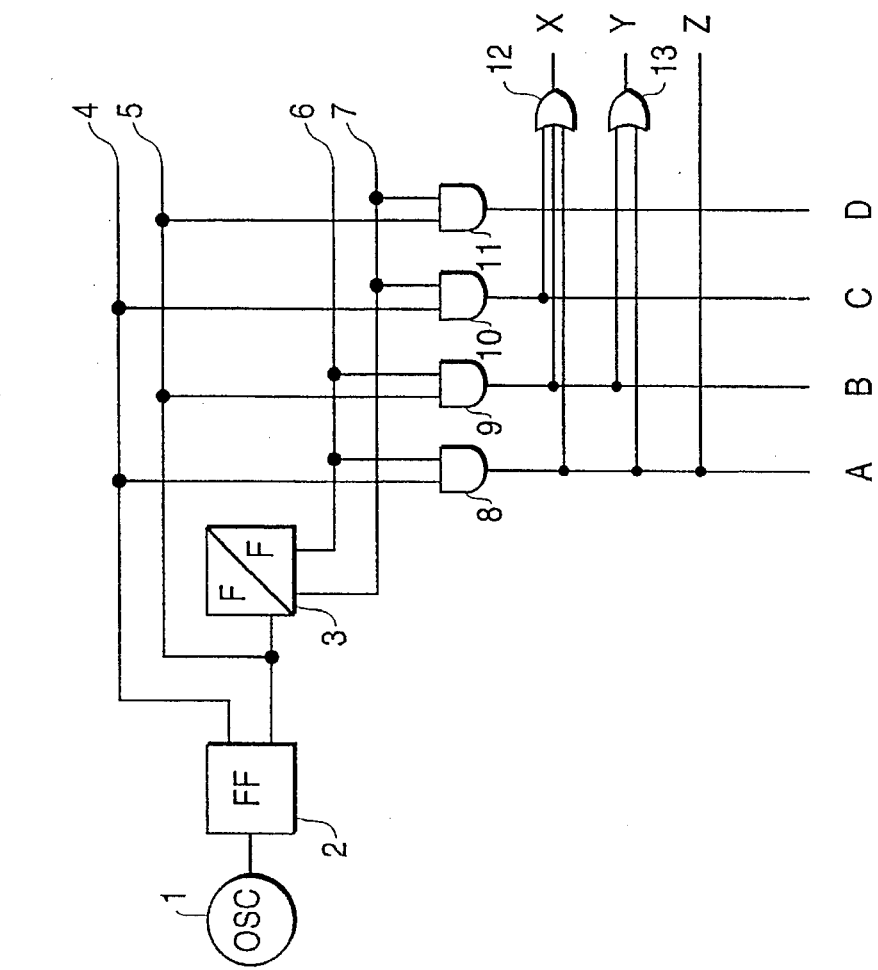
FIG. 1 is a schematic diagram of a circuit for forming current signals according to the invention.

FIG. 1 essentially shows the internal elements of the integrated circuit making it possible to generate the base signals necessary for the transmission of information. An internal clock 1 supplies a precise base frequency to a division chain formed by two flip-flops 2, 3, which divide said base frequency by 4. Outputs 4, 5, 6 and 7 of these flip-flops are connected to the inputs of four AND gates 8, 9, 10, 11, which, at their respective outputs, supply the signals A, B, C and D. The outputs of gates 8, 9, 10, 11 are connected to the inputs of OR gates 12, 13 making it possible to generate the signals X, Y and Z.

Figure 2:
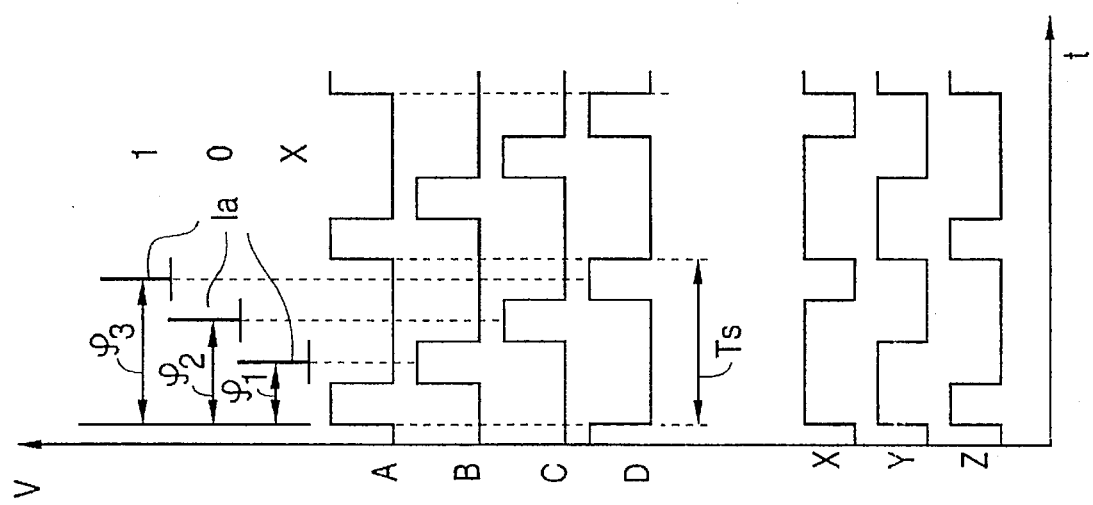
FIG. 2 is a waveform diagram showing the shape of the signals generated by the circuit according to FIG. 1.

FIG. 2 shows that the signals A, B, C and D are of identical frequency, but are offset from each by a quarter cycle. On the basis of these signals are obtained the three signals X, Y and Z of equal frequency, whose leading edges are superimposed, i.e., time-aligned but whose widths are different. To each width can correspond a separate logic state, e.g. X for the signal X. 0 for the signal Y and 1 for the signal Z. The logic state X corresponds to a special state, which can e.g. be used as a separator between two groups of 1 and 0. By modulating the current consumed by the integrated circuit as a function of these signals X, Y and Z, e.g. by switching a load to the power supply by means of a transistor, there is a serial transmission to the exterior of the integrated circuit of the information contained in the EEPROM. In order to read said information, it is merely necessary for the reading system to measure the variations of the supply current in the integrated circuit and interpret these current signals as a function of their widths in order to store the information transmitted by the integrated circuit. Clearly the integrated circuit must be provided with the means necessary for reading the memory and transforming the information contained therein into serial information. These means are dependent on the configuration of the memory and its accesses. Such means are well known in the art and will not be described here.

In FIG. 2 there are also the pulses Ia, which are generated by the voltage signals superimposed on the power supply. It can be seen that, as a function of the phase $\phi 1$, $\phi 2$, $\phi 3$ of said signals with the current signals generated by the integrated circuit, the pulses Ia will be in phase with the signals B, C or D, each of said phases being able to correspond with a logic state, e.g. X, 0 and 1 of the information to be transmitted to the integrated circuit. The functionality of these pulses Ia will be explained relative to FIG. 4.

Figure 3:
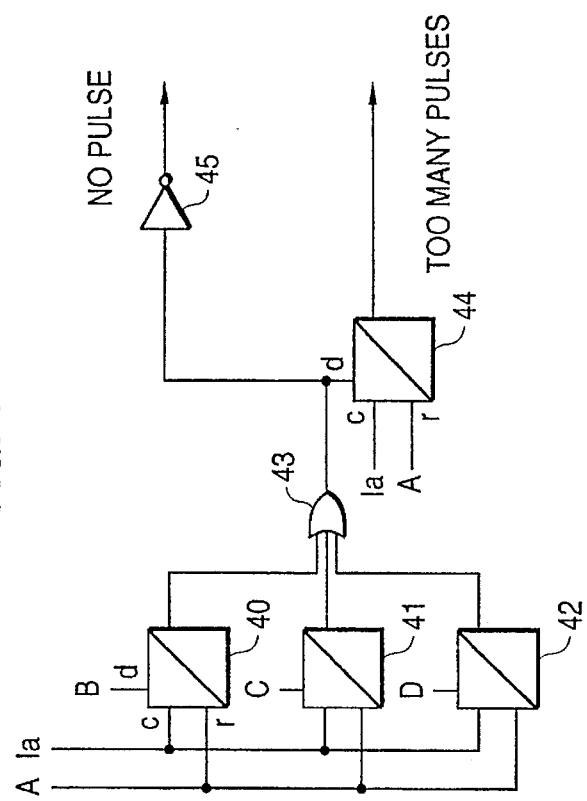
FIG. 3 is a schematic diagram of an amplifier of voltage signals on the power supply of the circuit.

FIG. 3 shows in exemplified manner a CMOS-type amplifier making it possible to generate pulses Ia from voltage pulses 30 superimposed on the supply voltage of the integrated circuit. The signal A generated by the circuit of FIG. 1 is applied to the input of an inverter 31, whose output passes to the gate of a transistor 32 and to an input of an OR gate 33. The collector of the transistor 32 is connected to the emitter of the transistor 34, whose gate and collector pass to a capacitor 35. The capacitor is connected to the input of an inverting amplifier formed by transistors 36, 37, whose gates and collectors are each other, the gates forming the amplifier input and the collectors its output, said output being connected to the second input of gate 33. Finally, the gate, collector and emitter of a transistor 38 are connected, respectively, to the input and, output of the amplifier.

When the signal A is positive, the output of the inverter 31 is at 0. Therefore the output of the OR gate 33 is blocked at 0 and the amplifier is unable to supply pulses Ia at its output. The signal A is used for initializing the pulse detection system 68, 48 in the supply and the amplifier will only supply pulses at its output if a pulse 30 arrives during the signals B, C or D. During the signal A, the transistors 32 and 34 make it possible to charge the capacitor 35, whereas the transistor 38 makes it possible to discharge it across the transistor 37. The voltage at the terminals of the capacitor 35 is stabilized at the time when the charging and discharging currents balance. At this balance or equilibrium point, the transistors 36 and 37 are conductive and the amplifier is polarized in class B, the transistor 37 being more conductive than the transistor 36. because it supplies not only the current passing through the transistor 36, but also that passing through the transistors 32 and 34.

When the signal A becomes equal to 0, the transistors 32 and 34 are no longer conductive and the capacitor 35 maintains the polarization of the amplifier 36, 37 in class B. The output of the latter is low and the output of the gate 33 is at 0. When a pulse 30 superimposed on the supply voltage appears in the supply line 39, the transistor 36 becomes more conductive than the transistor 37. If said pulse on the supply line has an adequate amplitude, the output of the amplifier passes to 1, in the same way as the output of the gate 33. Thus, output pulses Ia are generated in response to the voltage signals superimposed on the power supply.

Figure 4:
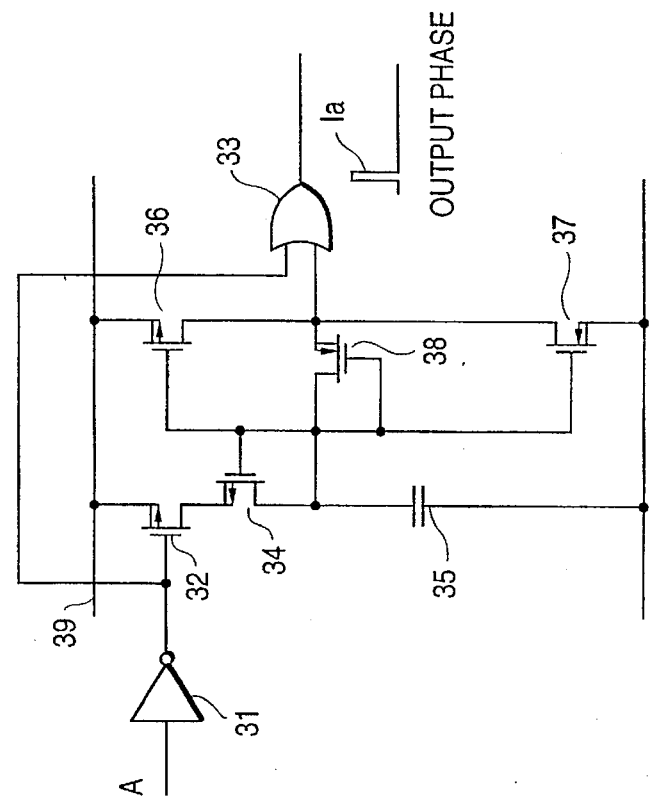
FIG. 4 is a schematic diagram of a the system of decoding the synchronous voltage signals according to the invention.

FIG. 4 shows in exemplified manner a circuit for decoding the pulses Ia corresponding to the pulses 30 superimposed on the power supply. This circuit on the one hand makes it possible to immediately detect the absence or excess of pulses and on the other attribute a logic significance X, Y or 1 to each pulse Ia as a function of whether it arrives simultaneously with the signals B, C and D. Thus, in the case of EEPROM or EPROM-type circuits, it is also necessary to be able to transmit information to the integrated circuit in order to be able to modify, if necessary, the content of the memory. This operation is particularly delicate to the extent that, whereas reading cannot deteriorate the memory content, a defective writing can bring about irreversible effects. Therefore the integrated circuit must be provided with means enabling it to easily separate the correct information from the outside from false information due to poor contacts or interference. Therefore the reading/writing system is arranged in such a way as to generate voltage signals superimposed on the power supply, said signals being detected by an amplifier, which supplies corresponding pulses In, as stated hereinbefore (FIG. 3). These signals are synchronized with the current signals supplied by the integrated circuit (FIG. 2), so as to be in phase with one of the outputs B, C or D of the gates 9, 10 and 11 of FIG. 1, each of these phases corresponding to a logic state X, 0 or 1 of the information which must be transmitted by the reading system to the interior of the integrated circuit.

FIG. 4 diagrammatically shows a circuit making it possible to decode these three states X, 0 and 1 and immediately detect any transmission error. In order to separate these three states, the pulses Ia are applied to the clock inputs of three D flip-flops 40, 41, 42, whose reset inputs are connected to the output of the gate 8 of FIG. 1, which supplies the signal A. The D inputs of the three flip-flops 40, 41, 42 are connected to the outputs of gates 9, 10 and 11 of FIG. 1, which supply the signals B, C and D. The outputs of the three flip-flops 40, 41, 42 are connected to the inputs of an OR gate 43, whose output passes to the D input of a D flip-flop 44.

On considering as a reference the cycle of the current signal generated by the integrated circuit, the latter is subdivided into four quarters corresponding to the signals A, B, C and D. In the first cycle quarter A, the flip-flops 40, 4 i, 42 and 44 are reset to 0. Then, if the pulse Ia occurs during the second cycle quarter, it is the flip-flop 40 which passes to 1. Similarly, flip-flop 41 produces a 1 if the pulse occurs during the third cycle for the fourth cycle quarter, which corresponds to the states X, 0 and 1 of the information to be transmitted.

When functioning correctly, the reading/writing system must generate one pulse per cycle. Therefore at least one of the flip-flops 40, 41 or 42 passes to 1 and the output of the gate 43 passes to 1. This output is connected to the input of an inverter 45, whose output passes to 0.

If as a result of a malfunction, e.g. a poor contact, no pulse Ia occurred during the considered cycle, or the flip-flops remain at 0 and the output of the amplifier 45 will remain at 1, which corresponds to a "NO PULSE" state.

However, if interference occurs and there has been more than one pulse Ia during the considered cycle, the following occurs. The first pulse will switch a flip-flop to 1 in the same way as the output of the gate 43. This output passes to the D input of the flip-flop 44, which passes to 1. At the second pulse Ia, said flip-flop 44 will therefore also pass to 1, which corresponds to a "TOO MANY PULSE" state.

Thus, each operating error is immediately detected within the integrated circuit, which makes it possible to immediately interrupt the writing process in exemplified manner. Thus, this combination gives an almost absolute security in the transmission of information.

FIG. 5 schematically shows the configuration of the reading/writing system and more particularly the synchronization circuit 167 between the current signals at the output of the integrated circuit and the voltage signals at its input. The elements to the right of the dotted line 69 are internal elements which have already been described and which form part of the integrated circuit, whereas the elements to the left more particularly relate to elements of the reading/writing system. FIG. 5 shows the integrated memory circuit (IMC) 46 with its oscillator and divider by 4, which generates by means of a shaping logic circuit 47 the signals X, Y and Z of cycle Ts, described with reference to FIG. 1. These signals are transmitted to the outside by means of a transistor 66, which switches a load 67 connected to the supply line 39. The switching of this load creates on said supply line the current signals making it possible to transmit to the outside the information X, Y or Z. It is also possible to see the amplifier 68 shown in FIG. 3 supplying pulses Ia to the decoder 48 shown in FIG. 4.

In the reading/writing system, these current signals X, Y, Z of fixed cycle Ts reaching the integrated circuit in the line 39 are amplified and filtered by an input amplifier 49 and then transmitted to the input of a divider by 1000 50, which therefore supplies on its output a signal of cycle Ts/1000.

The reading/writing system also has an internal oscillator 51 of cycle To connected to the input of a second divider by 1000 52, whose output cycle is To/1000. The output of said divider 52 is connected to the input of a third divider by 1000 53. The logic outputs of said divider 53 are connected to the data inputs of a buffer memory 54 connected to the selection inputs of a programmable rate divider 55 receiving on its-input the signals of cycle To supplied by the oscillator and supplying on its output signals of cycle Te.

When the divider 50 has performed a complete cycle, the state of the divider 53 is stored in the memory 54 and then the dividers 52 and 53 are reset to 0. If N is the state of the divider 50 at this particular moment, we obtain the relation:

N*1000 To=1000 Ts hence

N=Ts/To.

The output cycle of the programmable divider 55, whose division rate has been fixed at N by the memory 54 is:

$$Te=N*To=Ts$$

Thus, equality exists between the signal Te supplied by the reading/writing system and the signal Ts supplied by the integrated circuit, the circuit 67, described hereinbefore, functioning as a synchronization circuit between these signals.

This configuration has been described more from the standpoint of providing an understanding of the system than as a practical case. Thus, there are commercially available integrated frequency synthesizing circuits (PLL) used very widely in radio, which carry out said synchronization function in a much more satisfactory manner than the circuit described relative to FIG. 5.

The circuit of FIG. 5 also has a microprocessor 56, which controls the different control and transmission functions of data coming from or passing to the integrated circuit. This microprocessor is connected by a bus to a shaping circuit 57 for the voltage signals, which are superimposed on the supply voltage of the integrated circuit as a function of the logic states X, 0 or 1 of the informations to be transmitted. This microprocessor is programmed either by a dedicated internal ROM (masked ROM), or by an EPROM 58 external of the microprocessor, but fixed in the reading/writing system. This system can also comprise an interchangeable memory 59, which contains sub-programs dedicated to a particular user, e.g. relating to access codes or to a particular encryption of the content of the integrated circuit memory.

FIG. 6 diagrammatically shows in exemplified manner the complete system with its reading/writing device 60, which contains the reading/writing system described relative to FIG. 5, but can also include a keyboard 61 making it possible to select functions or introduce variables, together with a display 62 making it possible to read the information and in general terms-communicate with the system. The device can also include a location-63, where it is possible to connect an interchangeable memory 64 containing program elements appropriate for a particular use or user. The reading/writing device also has means for direct or indirect connection to the particular integrated memory circuit. These connecting means can e.g. be in the form of a contactor light pen 65 in the manner of certain commercial light pens/voltage controllers.

FIG. 7 shows a detail of said light pen with a metal body 70 and a contact tip 71 mounted on a spring 72. The contact tip 71 slides in an insulating tube 73 fitted in the body of the light pen 70, which is earthed or grounded. Therefore the body of the pen 70 is connected to the neutral pole of the power supply and the contact tip 71 to the active pole thereof, on which are superimposed the voltage signals generated by the reading/writing system. For current applications, the earth or ground contact can take place with metal tweezers connected to the light pen by a flexible wire, as is the case in the aforementioned light pens/controllers. If the connection with the integrated memory circuit takes place by coaxial contacts, the central contact will be established by the tip 71 and the external contact by a conductive rubber ring 74 fixed to the end of the pen metal body. This conductive rubber has a certain elasticity, which facilitates the maintaining of contact.

There are numerous variants which are possible to the system according to the invention, but their description would not lead to novel elements facilitating the understanding of the system. For example, the circuits 46, 47 and 48 can be integrated into the same integrated circuit or can constitute separate circuits and form part of another element or integrated circuit connected to the integrated memory circuit.

I claim:

1. A method for bidirectional serial data transmission between an integrated memory circuit and a reading/writing circuit which are separated from each other comprising the steps of providing an integrated memory circuit having two electrical contact points, providing a reading/writing circuit with a connecting element having two contacts, enabling data transmission by connecting the two-contact connecting element to the two electrical contact points of the integrated memory circuit, in the memory circuit, periodically generating and sending through the contacts to the reading/writing circuit an initializing current clock signal commencing a clock cycle Te, in the reading/writing circuit, detecting the initiating pulse and producing a voltage signal synchronized with the initiating pulse and sending the voltage signal through the contacts to the integrated memory circuit, the voltage signal having a selected phase relationship with the initiating pulse and comprising a voltage data pulse superimposed on the voltage signal to the integrated memory circuit, transmitting data from the integrated memory circuit to the reading/writing circuit by modulating supply current consumed by the integrated memory circuit, and driving the integrated memory circuit with an internal clock output and means for generating signals corresponding with data to be transmitted to the reading/writing circuit.

2. A system for bidirectional serial data transmission comprising an integrated memory circuit having two electrical contact points;

a reading/writing circuit having a connecting element with two contacts;

means for superimposing voltage pulses on voltage supplied to the integrated memory circuit to transmit data from the reading/writing circuit to the integrated memory circuit with said two contacts of said connecting element connected to said two electrical contact points;

means for modulating supply current consumed by the integrated memory circuit to transmit data from the integrated memory circuit to the reading/writing circuit;

an internal clock in said integrated memory circuit having a precise base frequency output;

a division chain dividing the internal clock output to generate a plurality of divided clock signals (A, B, C, D) offset in phase from each other;

a plurality of gates for combining said plurality of clock signals to generate equal-frequency signals (X, Y, Z) having time-aligned leading edges and different widths;

reading means for reading data stored in the integrated memory circuit;

transformation means for correlating data to be transmitted with the equal-frequency signals, and a load switched in a supply line to said integrated memory circuit in response to the width of said signals for changing the current consumed by the integrated memory circuit.

3. A system according to claim 2 wherein the divided clock signals are offset from each other by one-quarter cycle, said transformation means including combining the divided clock signals to form logic signals representing logic states wherein two logic signals represent binary state signals and a third signal (X) is a separator signal for separating the binary state logic signals, and wherein a first binary state signal has a width of two quarter-cycles (A+B), a second binary state signal has a width of one quarter cycle, and the separator signal has a width of three quarter-cycles.

4. A system according to claim 3 wherein every cycle comprises one voltage pulse, the voltage pulses having equal frequency and a leading edge aligned with an initializing clock signal, each voltage pulse having a width corresponding to one of said logic signals whereby a voltage pulse corresponding to the first binary state signal (Y) has a width of two quarter-cycles, a voltage pulse corresponding to a second binary state signal has a width of one-quarter cycle, and a voltage pulse corresponding to a separator signal has a width of three quarter-cycles.

5. A system according to claim 4 wherein said integrated memory circuit includes an amplifier (68) initialized in response to detection of an initializing clock signal at an amplifier input;

said amplifier detecting voltage pulses superimposed on the supply voltage and corresponding to data to be transmitted to the integrated memory circuit; and said amplifier generating a pulse (Ia) for every voltage pulse detected within a cycle (Te) of received voltage pulses corresponding with signals (X, Y, Z) representing logic states so that said pulses are in phase with clock signals (B, C, D) following a logic signal.

6. A system according to claim 5 wherein the integrated memory circuit includes a decoder (48) enabling signal identification by setting flip flops connected to an OR gate, the decoder being reset after detection of an initializing clock signal at its input, one input of the flip flops being supplied with a pulse (Ia) detected by the amplifier (68) and another input being supplied with a phase clock signal, whereby said flip flops switch in response to each pulse in phase with a phase clock signal identifying every incoming pulse as corresponding to logic signals representing logic states.

7. A system according to claim 6 wherein the integrated memory circuit includes error detection circuit including a flip flop for detecting data transmission errors, the flip flop being reset in response to an initializing clock signal at a flip flop input, one input of the flip flop being connected to receive an input pulse detected by the detection circuit amplifier (68), and another input of the flip flop being connected to receive the output of said OR gate of said decoder so that the flip flop switches for each pulse in phase with the output of the decoder and determines the number of received voltage pulses per cycle (Te) and emits and error signal in response to too many or no pulses received per cycle.

8. A system according to claim 2 wherein said connecting element includes a central contact tip mounted on a spring.

9. A system according to claim 2 wherein said reading/writing circuit includes a fixed memory element for basic data for transcribing the content of the integrated memory circuit, a keyboard for introducing selectable data, and a display for displaying information to the user.

* * * * *